May 4, 1937.  M. D. McCAULEY  2,079,024

MAP DISPLAY MECHANISM

Filed Sept. 3, 1936  5 Sheets-Sheet 1

INVENTOR
Myron D. McCauley
BY
ATTORNEYS

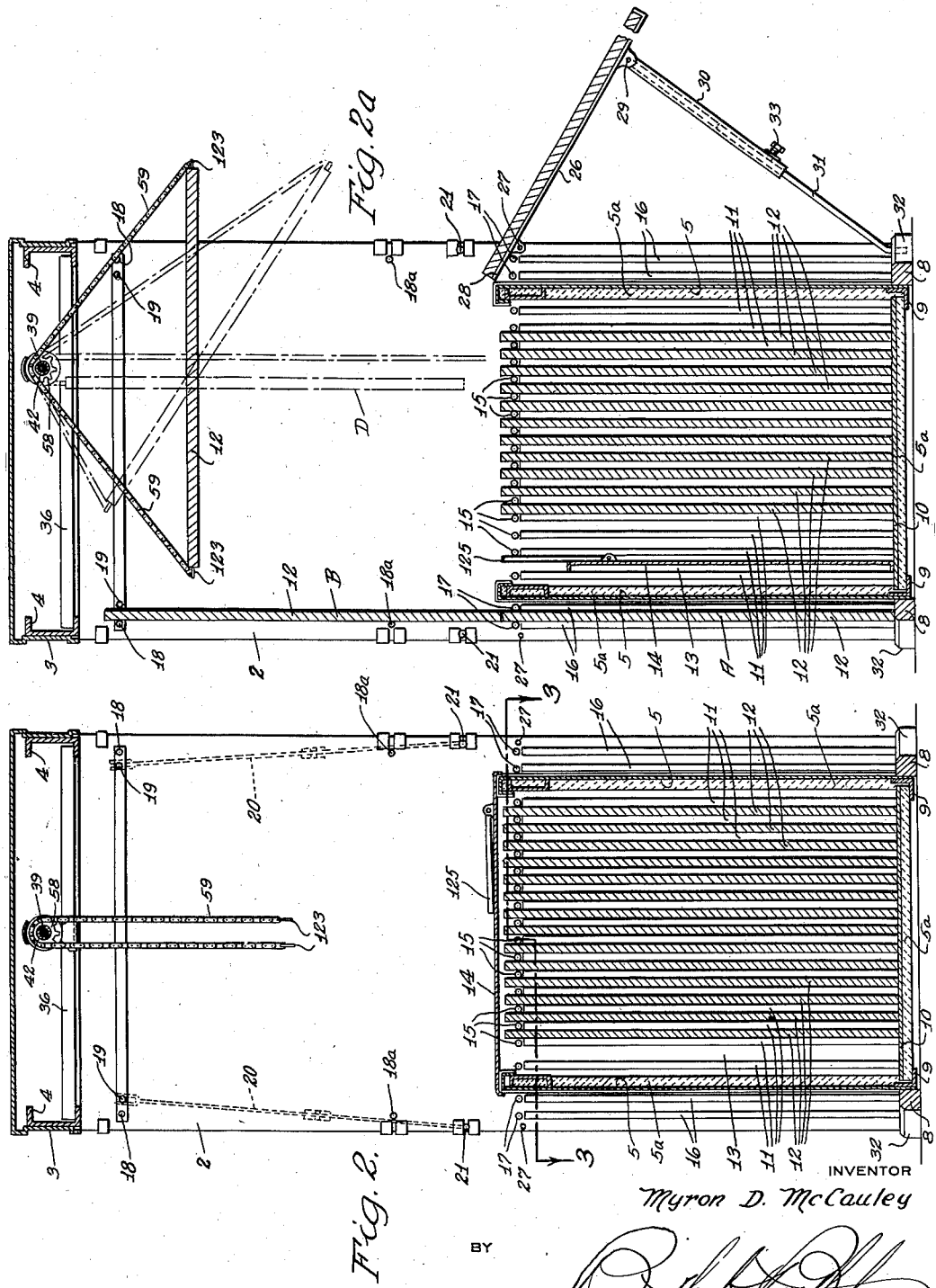

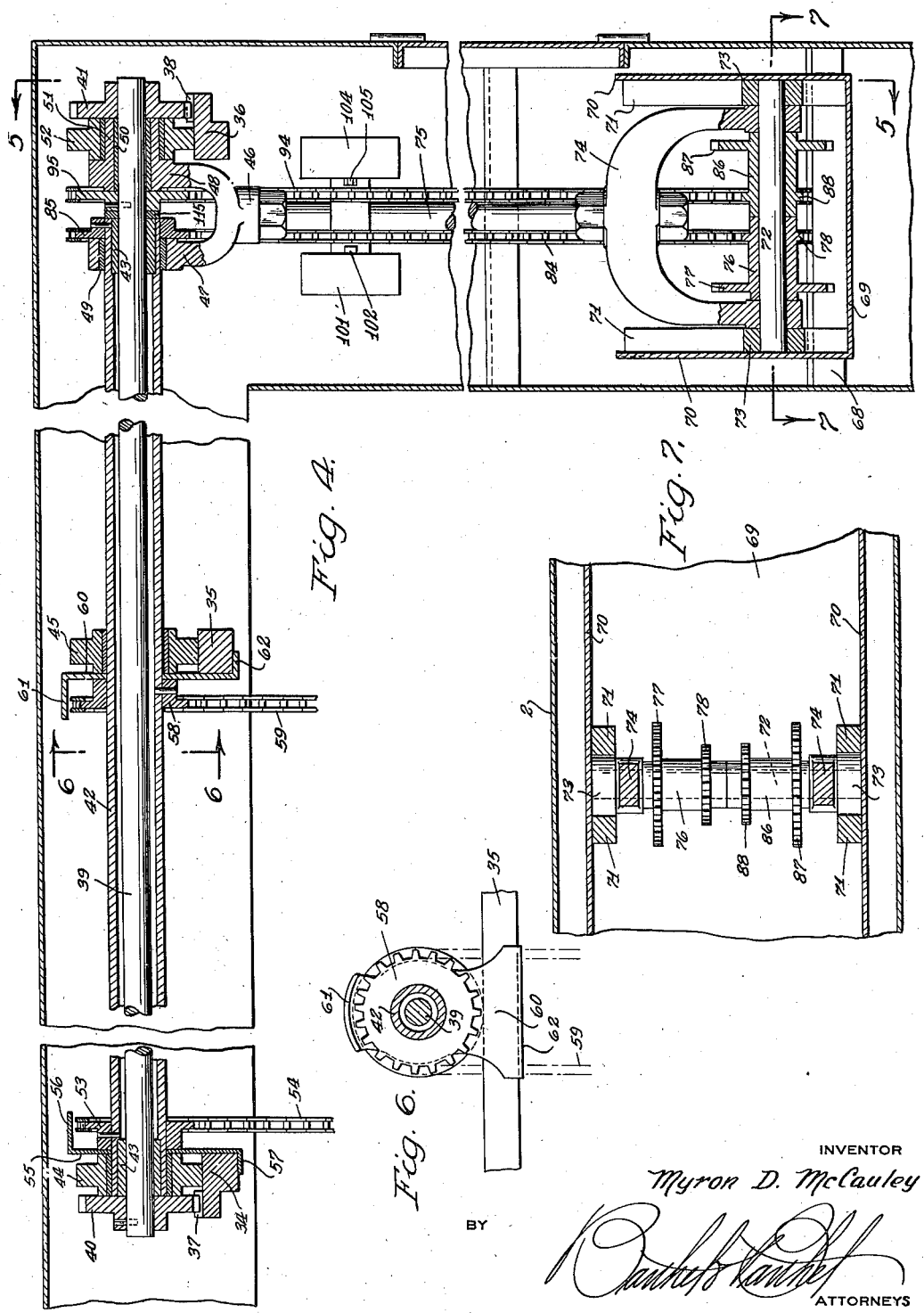

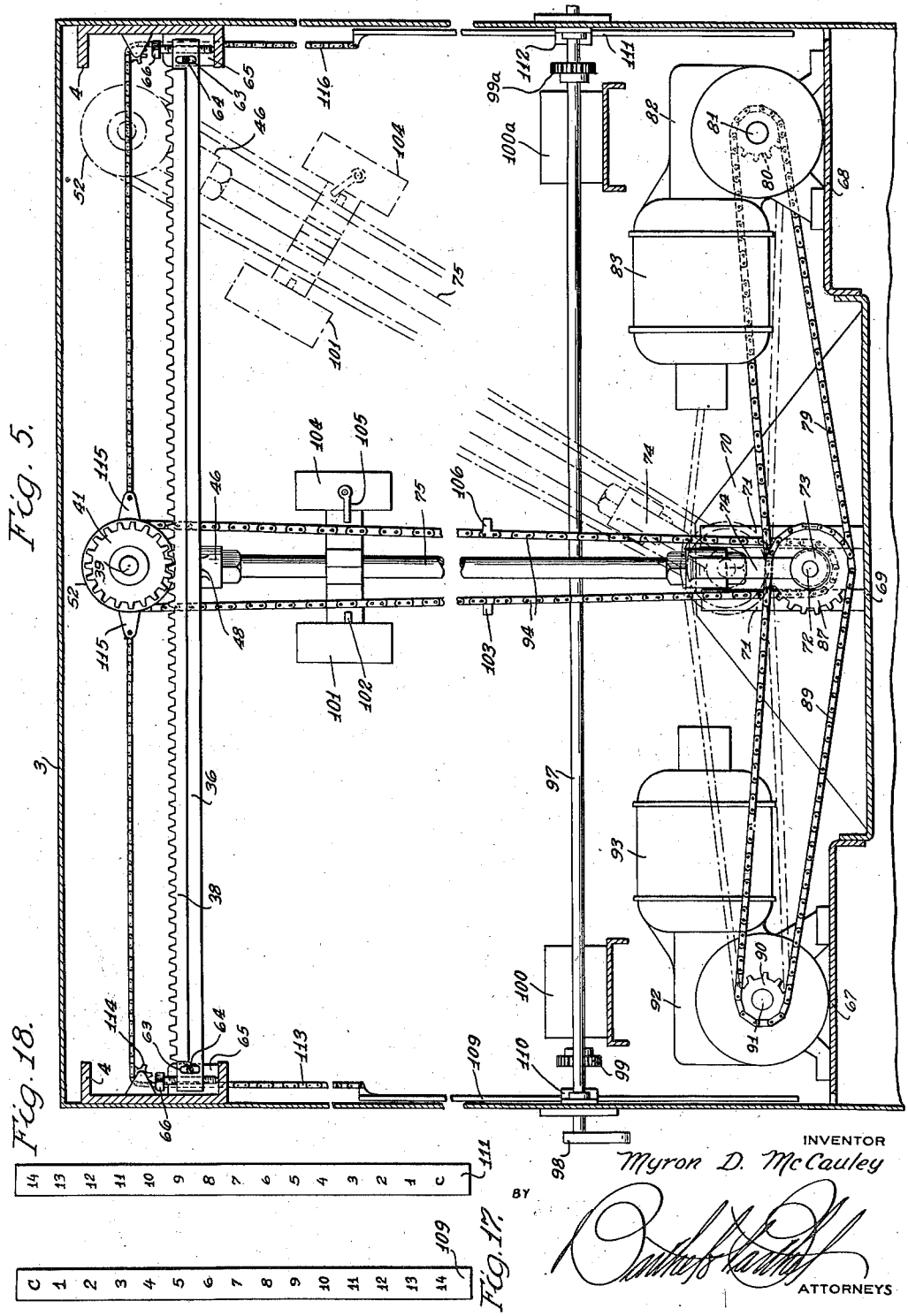

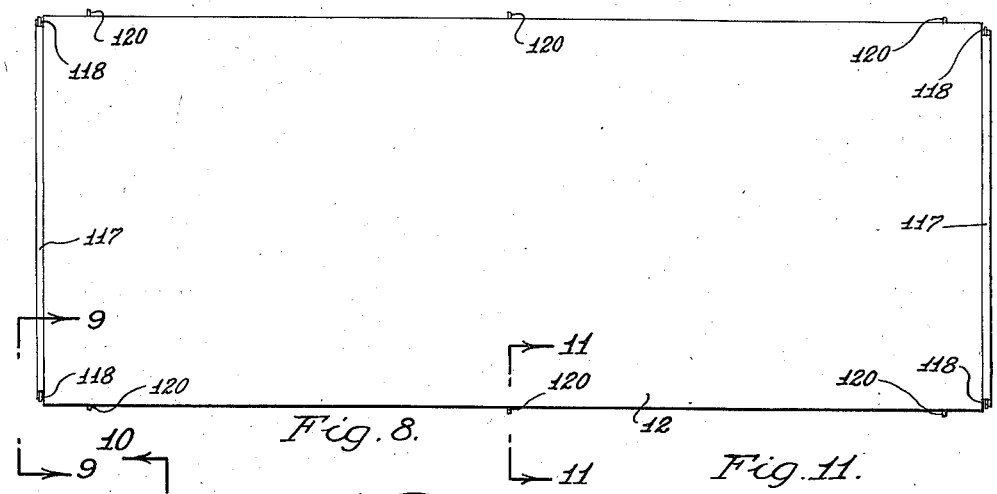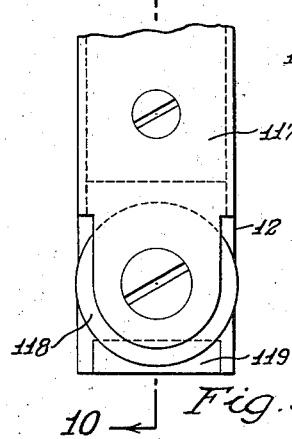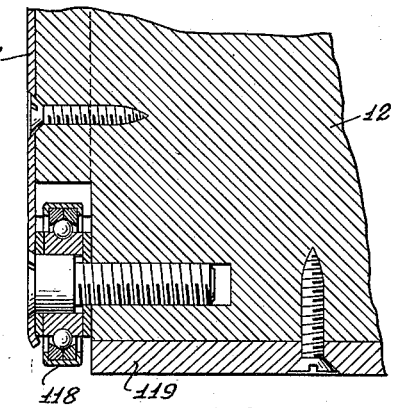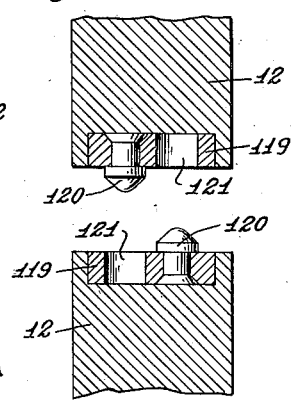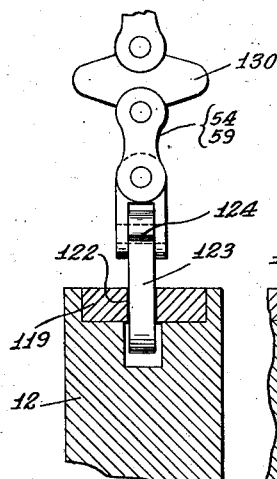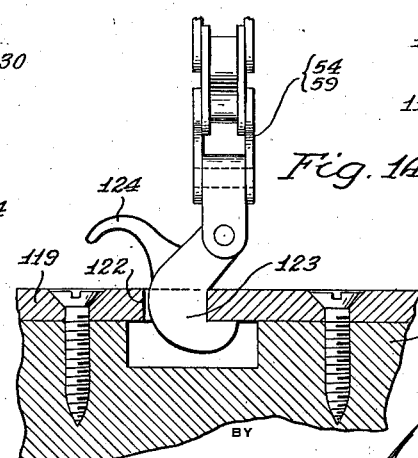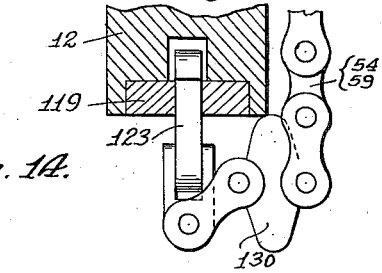

Patented May 4, 1937

2,079,024

UNITED STATES PATENT OFFICE 2,079,024

MAP DISPLAY MECHANISM

Myron D. McCauley, Huntington Woods, Mich.

Application September 3, 1936, Serial No. 99,249

21 Claims. (Cl. 40—63)

The present invention relates to apparatus for filing maps and like articles in a fire-proof cabinet and for selectively removing the maps from the storage compartment of such cabinet for the purpose of displaying the same to view. The apparatus is particularly designed for handling large maps, such as are used by municipalities, cities, governments, oil companies, public utilities, railroads, steamship companies, etc., and which ordinarily are of a size and weight which makes moving the same by hand very difficult.

The primary object of the present invention is to provide a metallic cabinet in which several panels, each bearing a map or a section of a map, may be stored or filed, the maps so stored or filed being protected from destruction by fire, water, dust or grime.

Another object of the invention is to provide a filing or storage cabinet of the character above referred to with electrically powered apparatus for selectively moving the map sections or panels so that they may be conveniently and closely inspected and also for moving them to positions where they may be inspected, checked, corrected or re-designed. As to this latter respect, the cabinet is provided with means for supporting the panels in a vertically disposed position, for supporting two panels with one resting upon the other, and for supporting the panels in an inclined position, similar to a drafting board position, so that work may be conveniently performed upon the maps.

Another object of the invention is to provide apparatus of the character referred to which may be operated from either side of the cabinet, to remove a cover from the compartment containing the panels and to place the same within the storage compartment, to selectively remove the panels from the storage compartment and to place them at the desired side of the cabinet for inspection, and to reverse the panels so that maps may be mounted on both sides thereof and the maps on either side thereof may be inspected from one side of the cabinet. The controls here referred to are electric switches having manually operable means at each side of the cabinet, and in combination with these manual controls the invention further provides automatic or safety controls for rendering the apparatus inoperative to move the panels beyond certain limits.

The apparatus for moving the panels comprises electrically operated chains with hooks for engaging the panels so that movement of the chains in one direction causes the panels to be elevated and removed from the storage compartment, and movement of the chains in the opposite direction lowers the panels into the storage compartment. One set of the safety controls above referred to operates to automatically stop movement of the chains when the panels have been elevated to the desired extent. When the panels are elevated by the chains the carrier for the latter may be moved along horizontal ways so as to carry the panels to either of two sides of the cabinet to permit close inspection thereof, and the other set of safety controls functions to automatically stop such horizontal movement at each side of the cabinet.

In apparatus wherein the map panels are moved vertically by chains, as above referred to, the movement of the panels is in a true vertical plane and it is essential, therefore, that the cabinet be supported so as to conform to such movement. Building floors, upon which the cabinet is designed to rest, are ordinarily not perfectly level and when the cabinet is placed upon a surface which is not level it does not permit the panels to move with freedom. Accordingly, it is another object of the present invention to provide the cabinet with means for adjusting its position with respect to different supporting surfaces which are not perfectly level, so that its vertical walls reside in a true vertical plane. Any tendency for the panels to bind in the cabinet while being moved vertically as a result of the ends of the panels engaging the sides of the cabinet is thus obviated. More specifically, the cabinet adjusting means comprises four jacks, with one being disposed adjacent each of the four corners of the cabinet and each being adjustable independently of the others.

Another object of the invention is to provide apparatus of the character referred to with an indicator at each side of the cabinet for indicating the position of the elevating and lowering chains with respect to a plurality of panels. The indicating means permits the operator to align the chains directly with selected panels so that when the panels are elevated from their racks in the storage compartment there is little tendency for them to bind frictionally in the racks.

Another object of the invention is to provide apparatus of the character referred to with removable means for supporting the panels in an inclined position outside of the cabinet so that the maps thereon may be checked, corrected or re-designed, the means for so supporting the panels also being adjustable in nature so that the angular position of the panel may be varied to suit the convenience of the person working upon the same.

Another object of the invention is to provide panels for apparatus of the character referred to embodying anti-friction means permitting freedom of movement thereof and dowel means for aligning two panels when one is rested upon the other. More particularly, the dowel means is so constructed as to permit the panels to be reversed with respect to each other.

With the above and other objects in view the invention consists in matters hereinafter more particularly set forth with reference to the accompanying drawings, in which—

Fig. 2 is a section taken on the line 2—2 of Fig. 1;

Fig. 2a is a section similar to Fig. 2 illustrating different stages of operation;

Fig. 4 is a vertical fragmental section;

Fig. 5 is a section taken on the line 5—5 of Fig. 4;

Figure 1:
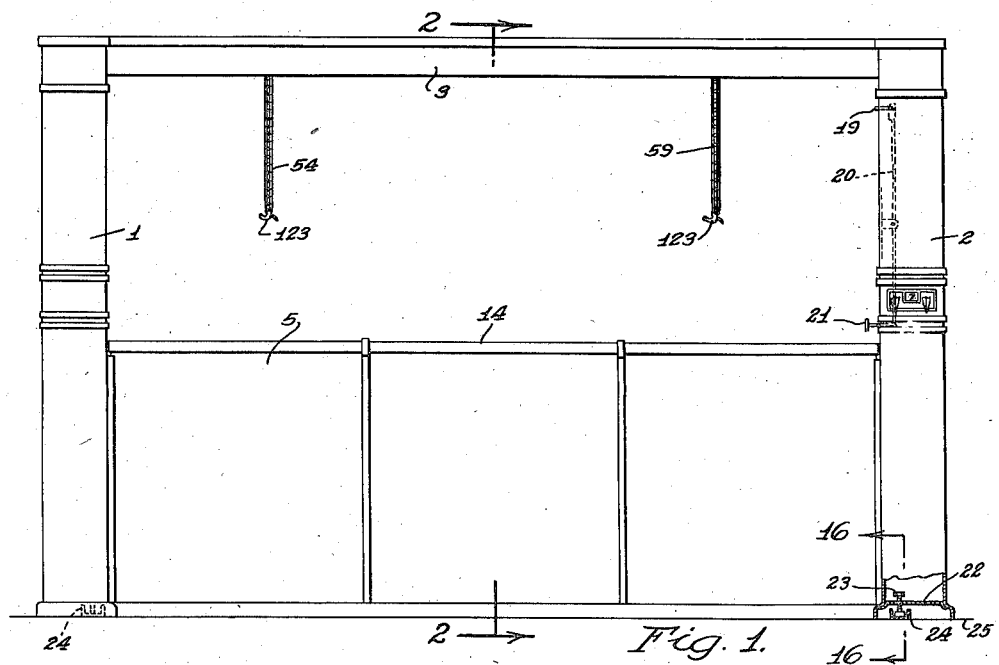
Figure 1 is a front elevation, partly broken away and in section.
Figure 3:
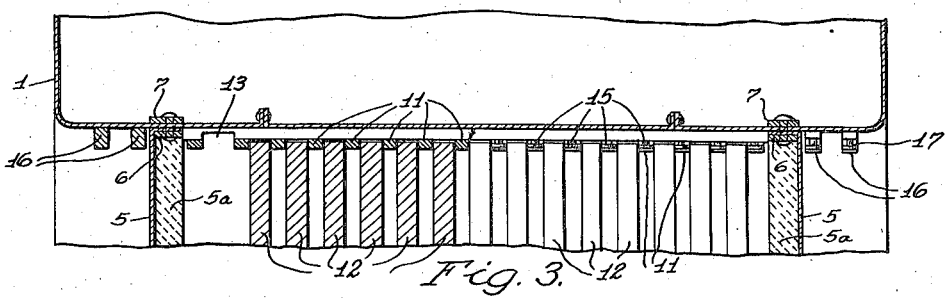
Fig. 3 is a section taken on the line 3—3 of Fig. 2.
Figure 15:
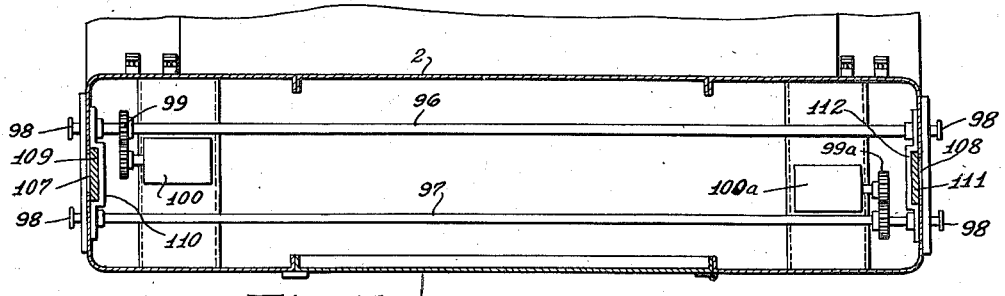
Figure 16:
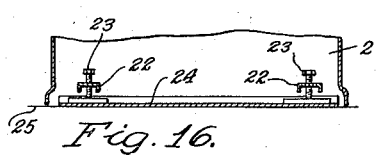

Figs. 6 and 7 are sections taken respectively on lines 6—6 and 7—7 of Fig. 5;

Fig. 8 is an elevation of a panel;

Fig. 9 is a view taken on the line 9—9 of Fig. 8;

Fig. 10 is a section taken on the line 10—10 of Fig. 9;

Fig. 11 is a section taken on the line 11—11 of Fig. 8;

Fig. 12 is a companion view to Fig. 11;

Figs. 13 and 14 are fragmental sections illustrating the hook attachment to the panels;

Fig. 15 is a horizontal section illustrating the manual controls;

Fig. 16 is a section taken on the line 16—16 of Fig. 1;

Figs. 17 and 18 are elevations of details, and

Fig. 19 is a section illustrating the function of a detail.

Like characters of reference are employed throughout to designate corresponding parts.

The cabinet in which the maps are received comprises two hollow end standards 1 and 2 united at their upper ends by a horizontal structure 3, the latter having reinforcing channels 4 extending along the vertical sides thereof. At their lower ends the two end standards are united by two spaced apart bulkheads 5, reinforced as at 6, and secured to the inner vertical surfaces of the end standards and to a reinforcement 7 therein. Trim members 8 are provided at the lower edges of the bulkheads on the outside thereof and angle irons 9 are secured to the lower inner edges thereof. The angle irons 9 support horizontal plates 10 upon which the map panels rest, as will be hereinafter described. Both the bulkheads 5 and the plates 10 are covered with refractory material 5a to render them fireproof.

To the inner surface of each end standard are secured a plurality of spaced apart strips 11, the strips being spaced apart a distance corresponding to the thickness of panels 12 and being extended vertically in parallel relationship. The strips 11 are equally spaced with the exception of one pair which are so spaced, as designated at 13, for the reception of the cover 14 which ordinarily rests upon the top of the bulkheads 5 to form a closed compartment therebetween. The strips 11 therefore constitute racks for supporting a plurality of panels 12 in a vertical, spaced apart relationship within the compartment so formed. At the top of each strip 11 is provided an anti-friction roller 15.

Externally of the compartment formed by the bulkheads 5, and disposed at each side of the cabinet, are a pair of guide strips 16 with anti-friction rollers 17 at the top ends thereof, the strips 16 being likewise secured to the inner surfaces of the two ends standards. In vertical alignment with each outer strip of each pair 16 on the end standards 1 and 2 are rollers 18a and 18, the latter being disposed in a horizontal plane spaced slightly below that of the horizontal structure 3. In vertical alignment with the inner strip of each pair 16 on the standard 2 and in the same horizontal plane as the rollers 18 and 18a is a slidable pin 19, there being a rocking lever 20 mounted in the end standard adjacent each pin and having one end thereof connected thereto. The other end of the rocking lever 20 has a hand actuator 21 connected thereto and extending through the wall of the end standard so that it may be moved manually to rock the lever 20 whereby its other end causes the pin 19 to be projected from the surface of the end standard or retracted within the standard.

Extending transversely of the end standards at the bottoms thereof are two rigid channel irons 22 receiving set screws 23 which bear against base members 24 which rest upon the supporting surface 25. Each set screw constitutes a jack and one of such jacks is thus disposed adjacent each corner of the cabinet and by adjusting the same the cabinet may be set in a position with the strips 11 and 16 and the inner surfaces of the end standards in a true vertical plane. The necessity for such regulation to compensate for any irregularity in the supporting surface 25 will become apparent upon description of the means for raising, lowering and moving the panels horizontally.

In Fig. 2a there is illustrated an inclined support for the reception of the panels 12, the support comprising two brackets 26 (one of which appears in the drawings) and removable securing means 27 for attaching one end of each bracket 26 to respective end standards so that the brackets may fulcrum around the same. It will be noted that when the bracket 26, shown in this view, is attached to the end standard by the securing means 27 the end 28 thereof projects across the space between the rollers 17 on respective end standards. Pivotally attached at 29 to the bracket 26 is a tubular element 30 slidably receiving the end of a rod 31 which is removably supported in the base 32 of the adjacent end standard. A set screw 33 in the tubular element 30 engages the rod 31 to hold it against movement relative to the tubular element and the two elements 30 and 31 therefore constitute adjustable means for holding the bracket 26 in various angular positions.

Supported in parallel relation in the horizontal structure 3 by the reinforcing channels 4 are three parallel tracks 34, 35 and 36, the tracks 34 and 36 having rack teeth 37 and 38, respectively, at one side thereof and extending throughout the length thereof. A shaft 39 extends transversely across the tracks 34, 35 and 36 and has a gear 40 on one end meshing with the rack teeth 37 and a gear 41 on its other end meshing with the rack teeth 38. A sleeve 42 is mounted upon the shaft 39 by anti-friction bearings 43 and rotatably mounted upon the sleeve 42 are rollers 44 and 45 which engage and are adapted to traverse the tracks 34 and 35 respectively. A yoke 46, forked to provide two arms 47 and 48, has its arm 47 mounted upon the end of the sleeve 42 by an anti-friction bearing 49 and its other arm 48 mounted upon the end of the shaft 39 by an anti-friction bearing 50. On the yoke arm 48 is provided a bearing portion 51 which rotatably supports a roller 52 which traverses the track 36.

Secured upon the sleeve 42 immediately adjacent to the roller 44 is a sprocket 53 over which is trained a chain 54. Interposed between the roller 44 and the hub of the sprocket 53 and loose with respect to the sleeve 42 is a plate 55 having an arcuate portion 56 extending over the sprocket 53 in such manner as to prevent accidental displacement of the chain 54 therefrom. The plate 55 also has an angular projection 57 which extends beneath and loosely engages the bottom surface of the track 34 so as to prevent accidental displacement of the roller 44 therefrom. A similar sprocket 58 is secured upon the sleeve 42 adjacent to the roller 45, the sprocket 58 having a chain 59 trained thereover. A plate 60 is loosely mounted between the sprocket 58 and the roller 45 and has an arcuate projection 61 extending over the sprocket 58 to prevent accidental removal of the chain 59 therefrom and a projecting portion 62 extending beneath the track 35 to prevent accidental removal of the roller 45 therefrom.

The means for mounting the three tracks 34, 35 and 36 upon the channel members 4 is adjustable in nature and inasmuch as all three are identical in this respect the adjustable means has been illustrated in connection with only one track, the track being the one designated 36 and illustrated more clearly in Fig. 5. Referring to Fig. 5, the track 36 has vertically extending slots 63 at each end thereof through which pins 64 extend, the latter being mounted in brackets 65 on the channels 4. In each end of the track 36 is mounted a set screw 66 for engagement with the lower flange of respective channel members 4. By rotating the set screws 66 the ends of the track 36 may be elevated or lowered within the limits defined by the slots 63 and pins 64.

From the foregoing it becomes apparent that rotation of the shaft 39 will cause the rollers 44, 45 and 52 to traverse their respective tracks and that through the adjustment means for the tracks the latter may be so positioned as to cause such movement to take place in a true horizontal plane. It is also apparent from the foregoing description that the sleeve 42 will be carried with the shaft during such horizontal travel and that rotation of the sleeve results in rotation of the sprockets 53 and 58 and movement of the chains 54 and 59. The means for rotating the shaft 39 and the sleeve 42 to provide such movements is powered by electric motors and will now be described with reference more particularly to Figs. 4, 5 and 7.

In the end standard 2 are mounted two motor supports 67 and 68 and a bracket 69 is secured between the motor supports. The bracket 69 has two parallel, vertically extending side walls 70 each supporting a pair of vertically extending guide members 71. A shaft 72 has rollers 73 on opposite ends thereof received in respective guides 71, the guides 71 thus being adapted to confine movement of the shaft 72 to a vertical plane. A forked yoke 74 is mounted upon the shaft 72 and is connected to the yoke 46, above described, by a rigid rod 75.

Rotatably mounted upon the shaft 72 is a sleeve 76 having two sprockets 77 and 78 thereon. The sprocket 77 is connected by a chain 79 to a sprocket 80 on a shaft 81 driven through a speed reducing gear mechanism (not shown) contained in a housing 82 by the electric motor 83, the motor and gear housing being mounted upon the above described motor support 68. The sprocket 78 is connected by a chain 84 to a sprocket 85 on the sleeve 42 so that upon operation of the motor 83 the sleeve 42 is caused to rotate. The motor 83 is of the reversible type so that it may be operated, as will hereinafter be described, to rotate the sleeve 42 in opposite directions.

Rotatably mounted upon the shaft 72 is a second sleeve 86 having two sprockets 87 and 88, the sprocket 87 being connected by an endless chain 89 to a sprocket 90 on a shaft 91 which is driven through a speed reducing gear mechanism (not shown) contained in the housing 92 by a motor 93. The other sprocket 88 is connected by an endless chain 94 to a sprocket 95 which is secured upon the shaft 39 so that upon operation of the motor 93 the shaft 39 is caused to rotate. The motor 93 is likewise of the reversible type so that it may cause rotation of the shaft 39 in opposite directions.

Extending through the end standard 2 are two rods 96 and 97 each having knobs or handles 98 on the ends thereof whereby manual pressure may be placed upon the same to cause rotation thereof. The rod 97 is geared as at 99 to an electric switch 100 which controls the electric current supply to the motor 93. The switch 100 is of a type available upon the market and of a type well known to those skilled in the switch art and for this reason has not been illustrated in detail here. For an understanding of the function of the present apparatus, however, it is pointed out that the switch operates when the rod 96 is rotated in one direction to cause operation of the motor 83 in one direction, it operates to cause operation of the motor 83 in a reverse direction upon rotation of the rod 96 in the reverse direction, and causes the motor to remain idle at an intermediate stage in the rotation of the rod 96. It becomes apparent, therefore, that movement of the rod 96 in one direction causes the sleeve 42 to rotate and move the chains 54 and 59 in one direction and opposite movement of the rod 96 causes opposite movement of the chains. In order to prevent too great a duration of movement of the chains 54 and 59 so that they might tend to run off their respective sprockets 53 and 58 a safety switch 101 is mounted upon the rod 75 and has an actuating lever 102 projecting into the path of movement of a finger 103 carried by the chain 84. The switch 101 functions to open the motor circuit so that further movement cannot take place in the direction in which the chain was previously moving yet does not prevent the switch 100 from closing the motor circuit to operate the motor in a reverse direction. The switch 101 is also of a type available on the market and known to those skilled in the art, and in view of this fact, has not been illustrated in detail here.

A switch 100a identical to the switch 100, is geared as at 99a to the rod 97 and controls the electric supply to the motor 93. The switch 102 functions upon manual rotation of the rod 97 to operate the motor 93 in opposite directions, thereby causing the shaft 39 to rotate and the rollers 44, 45, and 52 to traverse their respective tracks. In order to limit the travel of the rollers on their tracks a switch 104 is mounted upon the rod 75 and has a trigger 105 extending into the path of movement of a finger 106 carried by the chain 94. The switch 104 is identical to the switch 101 and functions upon movement of the chain 94 in either direction to render the motor 93 inoperative to move the rollers further in the direction they were previously travelling.

Adjacent each set of controls 98 for the rods 96 and 97 are provided openings 107 and 108 (see Fig. 15), an indicator bar 109 being mounted in a bracket 110 so that it may slide past the opening 107, and an indicator bar 111 being mounted in a bracket 112 so that it may slide past the opening 108. The indicator bar 109 is suspended by a chain or flexible element 113 which extends over a sprocket 114 on the channel reinforce 4 and which is connected to an element 115 carried loosely by the shaft 39. The indicator bar 111 is likewise suspended by a chain 116 which is also connected to the element 115. From the manner of support of the indicator bars 109 and 111 it becomes apparent that their position with respect to their respective openings 107 and 108 varies according to the position of the shaft 39. Each indicator bar bears indicia corresponding to the number of panels 12 stored in the compartment and also as to the cover, the indicia on one indicator being reversed with respect to the other.

As may be seen more readily upon reference to Figs. 8, 9 and 10, the panels 12 are reinforced along their vertical edges by metallic channels 117 and these channels assist in the support of anti-friction rollers 118 which are mounted at each of the four corners of the panels. The upper and lower edges of the panels 12 have metal strips 119 imbedded therein and having dowels 120 and dowel openings 121 therein. As may be seen upon comparison of Figs. 11 and 12 the dowels and dowel openings are so arranged that a pair of panels 12 may be reversed with respect to each other. Further, the strips 119 have openings 122 for the reception of hooks 123 on the ends of the chains 54 and 59. The hooks 123 are provided with finger pieces 124 permitting their removal from the openings 122 either by direct engagement of a person's hand therewith or by means of a pointer or stick. The cover 14 has a pair of arms 125 adapted to be engaged by the hooks 123. Each chain has an element with projecting wings 130 formed thereon, the solid element being located adjacent the hook.

With the parts as shown in Fig. 2 the first operation in displaying any of the map sections 12 is to remove the cover 14. The switch 100a is operated, therefore, to rotate the shaft 39 to position the chains 54 and 59 above the arms 125 on the cover, and the switch 100 is then operated to lower the chains so that the hooks on the ends of the chains 54 and 59 may be placed in engagement with the arms 125. The motor 83 is then set in motion to cause the chains 54 and 59 to lift the cover and after it has been elevated to a height whereby its lower edge is higher than the tops of the bulkheads 5 the safety switch 101 automatically stops the motor 83. The operator then actuates the switch 100a to cause the shaft 39 and sleeve 42 to move horizontally and at the time the character "c" on the indicator bars 109 and 111 appears in the openings 107 and 108 respectively the cover will be suspended above the space designated 13. The motor 83 is then operated to lower the cover into the space 13.

If it is desired to display two of the panels at the same time the panels are individually lifted from the rack strips 11 and the first one placed between a pair of the strips 16, as shown at A in Fig. 2a. The second panel is placed upon the first panel as designated at B, the upper end of the panel B being held from falling outwardly of the cabinet by the rollers 18. In order to permit release of the chain hooks from the panel B the pin 19 is moved to its projected position by movement of the actuator 21, in which case it engages the inner side of the panel B to prevent it from falling inwardly of the cabinet.

If it is desired to reverse a panel the same is elevated to the position shown at D in Fig. 2a, in which position the free ends of the chains may be connected to the opposite side from which the panel is being suspended. Then by operating the motor 93 the panel may be reversed. During reversal of a panel the wings 130 function to engage the panels as shown in Fig. 19, where they prevent the chains from contacting with the faces of the panels.

In order to place a panel upon the brackets 26 the same are conveyed as above described and placed above the ends 28 thereof. Then by lowering the panel its rollers 118 roll along the brackets and the panel may thus be lowered into an inclined position illustrated at E in Fig. 2a.

All of the panels 12 may be individually moved to any of the positions above described, and in practice each panel is given a number and the indicator bars numbered to correspond. Although the panels will not bind in their racks even though the pull of the chains is not directly vertical, due to the rollers 118, the indicator means permits the panels to be placed in direct alignment with their respective rack strips so that they may be lowered therein.

During movement of the shaft 39 and sleeve 42 horizontally the shaft 72 shifts vertically between the guides 71, as shown in full and chain lines in Fig. 5. It is obvious that during such movement the distance from the center of the shaft 72 to the shafts 81 and 91 changes. In order to permit such changing the chains 79 and 89 are provided with a slight amount of slack.

Although a specific embodiment of the invention has been illustrated and described it is to be understood that various changes may be made within the scope of the appended claims without departing from the spirit of the invention, and such changes are contemplated.

What I claim is:—

1. In combination, a cabinet having a compartment for the reception of a plurality of panels, said cabinet having means external of said cabinet for supporting a panel for inspection, means for moving said panels individually from said compartment to said means, and means for supporting a second panel upon a panel resting in said means.

2. In combination, a cabinet having a compartment for the reception of a plurality of panels, said cabinet having means external of said cabinet for supporting a panel for inspection, electrically operated means for moving panels from said compartment and for placing them in said means, and controls on opposite sides of said cabinet for controlling the operation of said electrically operated means.

3. In combination, a cabinet having a compartment for the reception of a plurality of panels, means external of said compartment for supporting panels, means removably attaching said supporting means to said cabinet, means for removing panels from said compartment and for depositing them upon said supporting means, and means for adjustably varying the angularity of said supporting means.

4. In combination, a cabinet having a compartment for the reception of a plurality of panels, a removable cover for said compartment, means within said compartment for the reception of said cover, means for elevating and lowering said cover, and means for moving said cover horizontally to a position above said first named means whereby upon lowering operation of said second named means said cover is deposited in said first named means.

5. In combination, a cabinet having a compartment for the reception of a plurality of panels, a removable cover for said compartment, means within said compartment for the reception of said cover, means for elevating and lowering said cover, means for moving said cover horizontally to a position above said first named means whereby upon lowering operation of said second named means said cover is deposited in said first named means, and means for indicating externally of said cabinet when said horizontally movable means has positioned said cover above the means in the compartment for receiving the same.

6. In combination, a cabinet, a compartment in said cabinet having means for supporting a plurality of panels in a vertical position, panels in said means, means for raising and lowering said panels, means for moving said raising and lowering means horizontally, and means for indicating externally of said cabinet the position of said raising and lowering means with respect to the plurality of panels.

7. In combination, a cabinet, a compartment in said cabinet for the reception of a plurality of panels, a plurality of panels, means for raising said panels from and for lowering said panels into said compartment, means for moving said panels horizontally while in their raised position, and means adjustably supporting said cabinet in a level condition regardless of irregularities in its supporting surface.

8. In combination, a cabinet, a compartment in said cabinet for the reception of a plurality of panels, a plurality of panels, means for raising said panels from and for lowering said panels into said compartment, means for moving said panels horizontally while in their raised position, and means adjustably supporting said cabinet in a level condition regardless of irregularities in its supporting surface, said last named means comprising four jacks with one disposed at each corner of the cabinet.

9. In apparatus of the character described, a cabinet, a compartment in said cabinet adapted for the reception of a plurality of panels, a row of panels in said compartment, a horizontally movable carrier movable in the direction of the length of the row of panels, sprockets rotatably supported by said carrier, means for rotating said sprockets in unison, chains trained over said sprockets and having their free ends depending therefrom, and means on the two free ends of each chain for detachably connecting the chains to said panels.

10. In apparatus of the character described, a cabinet, a compartment in said cabinet adapted for the reception of a plurality of panels, a row of panels in said compartment, a horizontally movable carrier movable in the direction of the length of the row of panels, sprockets rotatably supported by said carrier, means for rotating said sprockets in unison, chains trained over over sprockets and having their free ends depending therefrom, means on the two free ends of each chain for detachably connecting the chains to said panels, electrical means for rotating said sprockets to move said chains, and safety controls for said electrical means for automatically stopping operation thereof to prevent the ends of said chains from running off their respective sprockets.

11. In apparatus of the character described, a cabinet, a compartment in said cabinet adapted for the reception of a plurality of panels, a row of panels in said compartment, horizontal tracks in said cabinet extending in the direction of the length of the row of panels, a carrier having rollers adapted to traverse said tracks, sprockets rotatably mounted on said carrier, individual power means for said carrier and sprockets disposed remote therefrom upon a stationary base, means providing an operative driving connection between said carrier and sprockets and their individual power means during movement of said carrier in traversing said rails, and chains trained over said sprockets and depending therefrom, each chain having means on the two free ends thereof for detachably connecting said chains to said panels.

12. In apparatus of the character described, a cabinet, a compartment in said cabinet adapted for the reception of a plurality of panels, a row of panels in said compartment, horizontal tracks in said cabinet extending in the direction of the length of the row of panels, a carrier having rollers adapted to traverse said tracks, sprockets rotatably mounted on said carrier, individual power means for said carrier and sprockets disposed remote therefrom upon a stationary base, means providing an operative driving connection between said carrier and sprockets and their individual power means during movement of said carrier in traversing said rails, chains trained over said sprockets and depending therefrom, each chain having means on the two free ends thereof for detachably connecting said chains to said panels, and means on said carrier for preventing accidental displacement of said chains from said sprockets.

13. In apparatus of the character described, a cabinet, a compartment in said cabinet adapted for the reception of a plurality of panels, a row of panels in said compartment, horizontal tracks in said cabinet extending in the direction of the length of the row of panels, a carrier having rollers adapted to traverse said tracks, sprockets rotatably mounted on said carrier, individual power means for said carrier and sprockets disposed remote therefrom upon a stationary base, means providing an operative driving connection between said carrier and sprockets and their individual power means during movement of said carrier in traversing said rails, chains trained over said sprockets and depending therefrom, each chain having means on the two free ends thereof for detachably connecting said chains to said panels, and means on said carrier for preventing accidental displacement of said rollers for said tracks.

14. In apparatus of the character described, a cabinet, a compartment in said cabinet adapted for the reception of a plurality of panels, a row of panels in said compartment, horizontal tracks in said cabinet extending in the direction of the length of the row of panels, a carrier having rollers adapted to traverse said tracks, sprockets rotatably mounted on said carrier, individual power means for said carrier and sprockets disposed remote therefrom upon a stationary base, means providing an operative driving connection between said carrier and sprockets and their individual power means during movement of said carrier in traversing said rails, chains trained over said sprockets and depending therefrom, each chain having means on the two free ends thereof for detachably connecting said chains to said panels, and means on said carrier having a portion adapted to prevent accidental displacement of said chains from said sprockets and portions adapted to prevent accidental displacement of said rollers from said tracks.

15. In apparatus of the character described, a cabinet, a compartment in said cabinet adapted for the reception of a plurality of panels, a row of panels in said compartment, tracks in said cabinet extending in the direction of the length of the row of panels, means supporting said tracks and adapted to be moved adjustably to place said tracks in a true horizontal plane, a carrier having rollers adapted to traverse said tracks, sprockets rotatably mounted on said carrier, individual power means for said carrier and sprockets disposed remote therefrom upon a stationary base, means providing an operative driving connection between said carrier and sprockets and their individual power means during movement of said carrier in traversing said rails, and chains trained over said sprockets and depending therefrom, each chain having means on the two free ends thereof for detachably connecting said chains to said panels.

16. In apparatus of the character described, a cabinet, a compartment in said cabinet adapted for the reception of a plurality of panels, a row of panels in said compartment, horizontal tracks in said cabinet extending in the direction of the length of the row of panels, a carrier having rollers adapted to traverse said tracks, sprockets rotatably mounted on said carrier, individual power means for said carrier and sprockets disposed remote therefrom upon a stationary base, means providing an operative driving connection between said carrier and sprockets and their individual power means during movement of said carrier in traversing said rails, chains trained over said sprockets and depending therefrom, each chain having means on the two free ends thereof for detachably connecting said chains to said panels, said cabinet having a visibility opening therein, an indicator bar slidably supported with respect to said opening, and means connecting said indicator bar to said carrier whereby the position of the indicator bar varies in unison with the position of the carrier.

17. In apparatus of the character described, a cabinet, a plurality of panels in said cabinet, a carrier adapted to move horizontally above said panels, a rotatable drive element on said carrier adapted to propel the same horizontally, flexible elements movable with respect to said carrier and adapted to engage said panels to raise and lower the same, a rotatable drive element for said flexible elements supported on said carrier, a rigid element connected to said carrier and depending therefrom, means for guiding movement of the depending end of said rigid element in a vertical path during horizontal movement of said carrier, a pair of drive elements supported at the depending end of said rigid element, means individually connecting said pair of drive elements with the first and second named drive elements on said carrier, and individual means for operating said pair of drive elements.

18. In apparatus of the character described, a cabinet, a plurality of panels in said cabinet, a carrier adapted to move horizontally above said panels, a rotatable drive element on said carrier adapted to propel the same horizontally, flexible elements movable with respect to said carrier and adapted to engage said panels to raise and lower the same, a rotatable drive element for said flexible elements supported on said carrier, a rigid element connected to said carrier and depending therefrom, means for guiding movement of the depending end of said rigid element in a vertical path during horizontal movement of said carrier, a pair of drive elements supported at the depending end of said rigid element, means individually connecting said pair of drive elements with the first and second named drive elements on said carrier, individual means for operating said pair of drive elements, a pair of motors mounted on stationary supports adjacent the depending end of said rigid element, and individual flexible connections between said motors and said pair of drive elements.

19. In apparatus of the character described, a cabinet, a plurality of panels in said cabinet, a carrier adapted to move horizontally above said panels, a rotatable drive element on said carrier adapted to propel the same horizontally, flexible elements movable with respect to said carrier and adapted to engage said panels to raise and lower the same, a rotatable drive element for said flexible elements supported on said carrier, a rigid element connected to said carrier and depending therefrom, means for guiding movement of the depending end of said rigid element in a vertical path during horizontal movement of said carrier, a pair of drive elements supported at the depending end of said rigid element, means individually connecting said pair of drive elements with the first and second named drive elements on said carrier, individual means for operating said pair of drive elements, individual safety controls for said individual means for operating said pair of drive elements, and means on said means which connects the pair of drive elements with the drive elements on said carrier for automatically operating said safety controls.

20. In apparatus of the character described, a panel, said panel having a channel shaped metal reinforcement along the vertical edges thereof, and anti-friction rollers supported at each of the four corners thereof.

21. In apparatus of the character described, a panel, said panel having a metal reinforcement in two opposed edges thereof, said reinforcement having means therein for the reception of securing means, and adjacent dowel and dowel holes adapted to align two panels when one is placed on top of another, said dowel and dowel holes being relatively disposed whereby to permit reversal of the panels with respect to each other.

MYRON D. McCAULEY.